United States Patent
Lee

(10) Patent No.: US 7,834,918 B2
(45) Date of Patent: Nov. 16, 2010

(54) METHOD AND DEVICE FOR EVALUATING RANDOM NOISE IN IMAGE SENSOR

(75) Inventor: Kwang-Hee Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 519 days.

(21) Appl. No.: 11/900,167

(22) Filed: Sep. 10, 2007

(65) Prior Publication Data

US 2008/0111924 A1    May 15, 2008

(30) Foreign Application Priority Data

Nov. 9, 2006    (KR) .................... 10-2006-0110627

(51) Int. Cl.
*H04N 5/217* (2006.01)
(52) U.S. Cl. .................................... 348/241
(58) Field of Classification Search .............. 348/241, 348/242, 243, 250, 253, 618, 619, 620, 622; 382/167, 261
See application file for complete search history.

(56) References Cited

U.S. PATENT DOCUMENTS

| | | | | | |
|---|---|---|---|---|---|
| 5,361,105 | A | * | 11/1994 | Iu | 348/699 |
| 5,387,946 | A | * | 2/1995 | Knee | 348/622 |
| 5,400,371 | A | * | 3/1995 | Natarajan | 375/240 |
| 5,548,659 | A | * | 8/1996 | Okamoto | 382/107 |
| 5,943,094 | A | * | 8/1999 | Sakai et al. | 348/243 |
| 6,593,956 | B1 | * | 7/2003 | Potts et al. | 348/14.09 |
| 6,603,535 | B1 | * | 8/2003 | McDowell | 356/28 |
| 6,868,190 | B1 | * | 3/2005 | Morton | 382/278 |
| 7,626,639 | B2 | * | 12/2009 | Yamauchi | 348/607 |
| 2005/0078223 | A1 | * | 4/2005 | Liu et al. | 348/701 |
| 2006/0158561 | A1 | * | 7/2006 | Yamauchi | 348/607 |
| 2006/0158562 | A1 | * | 7/2006 | Rhee | 348/607 |

FOREIGN PATENT DOCUMENTS

| | | |
|---|---|---|
| JP | 2001-24821 | 1/2001 |
| JP | 2003-264854 | 9/2003 |
| JP | 2003-331283 | 11/2003 |
| JP | 2006042258 | 2/2006 |
| KR | 19990068235 | 8/1999 |

* cited by examiner

*Primary Examiner*—Jason Chan
*Assistant Examiner*—Nicholas G Giles
(74) *Attorney, Agent, or Firm*—Mills & Onello, LLP

(57) ABSTRACT

A random noise evaluation method is comprised of: capturing and obtaining current image data; calculating a difference between the current image data and an average of previous image data; calculating a current difference square sum using a sum of the difference and a previous difference square sum; and calculating a random noise value using the current difference square sum. Since a noise evaluation algorithm obtains random noises without storing image data for all pixels of a*b*n, it is able to evaluate random noise evaluation for a high-resolution image sensor even with a relatively small size of memory.

17 Claims, 5 Drawing Sheets

METHOD AND DEVICE FOR EVALUATING RANDOM NOISE IN IMAGE SENSOR

CROSS-REFERENCE TO RELATED APPLICATIONS

This U.S. non-provisional patent application claims priority under 35 U.S.C. §119 to Korean Patent Application No. 10-2006-0110627 filed on Nov. 9, 2006, the entire contents of which are hereby incorporated by reference.

BACKGROUND

The present invention disclosed herein relates to image signal processing. In particular, the present invention disclosed herein relates to method and device for evaluating random noises of image signals.

With the rapid increase in the spread of portable apparatuses and digital cameras, demand for image sensors in the industry of portable electronic devices is consequently increasing. As customers are requiring high-quality products convenient in portability, manufacturers of digital products are pursuing miniaturization and high quality of all components embedded in products.

Developers of image sensors are trying to scale down a size of photodiodes of the image sensor for higher resolution and miniaturization. Image sensors are divided into charge-coupled devices (CCDs) and complementary metal-oxide-semiconductor image sensors (CISs). From trends in dimensional changes of photodiodes over several years, it can be seen that the shrink-down of photodiodes in the CIS is progressing faster than in the CCD. Otherwise, resolution of the image sensor continues to increase.

Those trends in miniaturization and higher resolution of image sensors are permissible based on the advancement of microscopic circuit design technology and semiconductor fabrication technologies. Scaling down a line width of a circuit to reduce a size of a photodiode of an image sensor varies resultant values of typical items used for evaluating characteristics of the image sensor. Typical items for evaluating characteristics of the image sensor are sensitivity, dynamic range, signal-to-noise ratio (SNR), noise, and so forth. The most significant evaluation item is 'noise' because a smaller size of photodiode causes deterioration of noise characteristic due to a lower optical signal level. Thus, there are required new ways of improving an optical signal level, for which the noise is the most important factor to determine improvement of the optical signal level. Further, the noise significantly affects results of image characteristic evaluation items. For example, an evaluation result for a dynamic range or SNR is variable in accordance with a noise evaluation data.

The noise, being important as a characteristic evaluation item of the image sensor, is classified into fixed pattern noise (FPN) and random noise (RN). The FPN means noise fixedly representing an output signal gap between adjacent photodiodes in an output image. The RN means noise continuously changing along time. The FTN of these two noise types are improvable by using high-tech signal processing.

A general algorithm for evaluating RN calculates a standard deviation of pixel output values on the same position, and calculating a root-mean-square (RMS) of all pixels. Such an RN evaluation algorithm requires a large-capacity memory for storing image data output from all pixels. As the number of pixels increases, a memory size increases by geometric progression.

SUMMARY OF THE INVENTION

The present invention is directed to a method and a device for evaluating random noises with the minimum size of a memory.

In accordance with one aspect of the present invention, provided is a random noise evaluation method comprised of: capturing and obtaining current image data; calculating a difference between the current image data and an average of previous image data; calculating a current difference square sum using the difference and a previous difference square sum; and calculating a random noise value using the current difference square sum.

The method can further comprise calculating a current image data average using the difference and a previous image data average.

Calculating the difference square and the current difference square sum can be repeated while inputting a predetermined number of frames.

The method can further comprise, at an i'th frame, where i is a positive integer, summing the current image data average with the previous image data average and dividing by i.

The method can further comprise, at an i'th frame, where i is a positive integer, obtaining the current difference square sum from an equation: [the previous difference square sum]−((i−1)/i)*[the difference].

The method can further comprise, when the whole number of frames is n, where n is a positive integer, calculating the random noise value by calculating a variance obtained from an equation: [the current difference square sum]/(n−1).

The random noise value can be a root-mean-square value of a square of the variance.

In accordance with another aspect of the present invention, provided is a random noise evaluation device of an image sensor, including: a memory; an image sensor including at least one pixel and configured to output an image signal in correspondence with light sensed by the at least one pixel; an image capture unit configured to output image data that is converted into a form of binary signal from the image signal of the image sensor; and a calculation unit configured to generate a random noise value of the image sensor using a series of the image data provided from the image capture unit. The calculation unit is configured to calculate: (1) a difference between current image data and an average of previous image data stored in the memory, (2) a current difference square sum using the square and a previous difference square sum stored in the memory, and (3) the random noise value using the s current square difference sum.

The calculation unit can be configured to store the sum of current difference square sum in the memory.

The calculation unit can be configured to operate to calculate a current image data average using the difference and the previous image data average.

The calculation unit can be configured to store the current image data average in the memory.

The calculation unit can be configured to calculate a variance using an equation: [The current difference square sum]/([the total image data number]−1), after calculating the current difference square sum for the series of image data.

The random noise value can be a root-mean-square value of a square of the variance.

When an i'th image data is input, where i is a positive integer, the calculation unit can be configured to calculate the current image data average as a sum of the previous image data average and [the difference]/i.

When an i'th image data is input, where i is a positive integer, the of current difference square sum can be obtained using an equation: [the previous difference square sum]− ((i−1)/i)*[the difference].

In accordance with still another aspect of the present invention, provided is a random noise evaluation device of an image sensor, including: a memory; an image sensor including at least one pixel and configured to output an image signal in correspondence with light sensed by the pixel; an image capture unit configured to output image data that is converted into a form of binary signal from the image signal of the image sensor; and a calculation unit configured to generate a random noise value of the image sensor using a series of image data provided from the image capture unit. The calculation unit includes: a counter configured to count a frame number of the series the image data input from the image capture unit; a first operation unit configured to output a difference between image data of a current frame and an average of image data of a previous frame stored in the memory; a second operation unit configured to divide an output of the first operation unit by the frame number; a third operation unit configured to calculate an average of image data of the current frame from adding an output of the second operation unit to the average of image data of the previous frame; a fourth operation unit configured to calculate a square of the output of the first operation unit; a fifth operation unit configured to multiply an output of the fourth operation unit by ([the frame number]−1)/[the frame number]; a sixth operation unit configured to calculate a square difference sum that is a difference between an output of the fifth operation unit and a difference square sum of the previous frame stored in the memory; a seventh operation unit configured to divide the difference square sum of the sixth operation unit by [the frame number]−1; and an eighth operation unit configured to calculate a random noise value that is a root-mean-square value of an output of the seventh operation unit.

The calculation unit can also be configured to store in the memory the average of image data of the current frame, which is output from the third operation unit, and the difference square sum output from the sixth operation unit.

The first and sixth operation units can be subtracters.

The second, fifth, and seventh operation units can be dividers.

The third operation unit can be an adder.

The fourth operation unit can be a multiplier.

A further understanding of the nature and advantages of aspects of the present invention herein can be realized by reference to the remaining portions of the specification and the attached drawings.

BRIEF DESCRIPTION OF THE FIGURES

Non-limiting and non-exhaustive embodiments in accordance with the present invention will be described with reference, to the following figures, wherein like reference numerals refer to like parts throughout the various figures unless otherwise specified. In the figures.

DETAILED DESCRIPTION OF PREFERRED EMBODIMENTS

Figure 1:
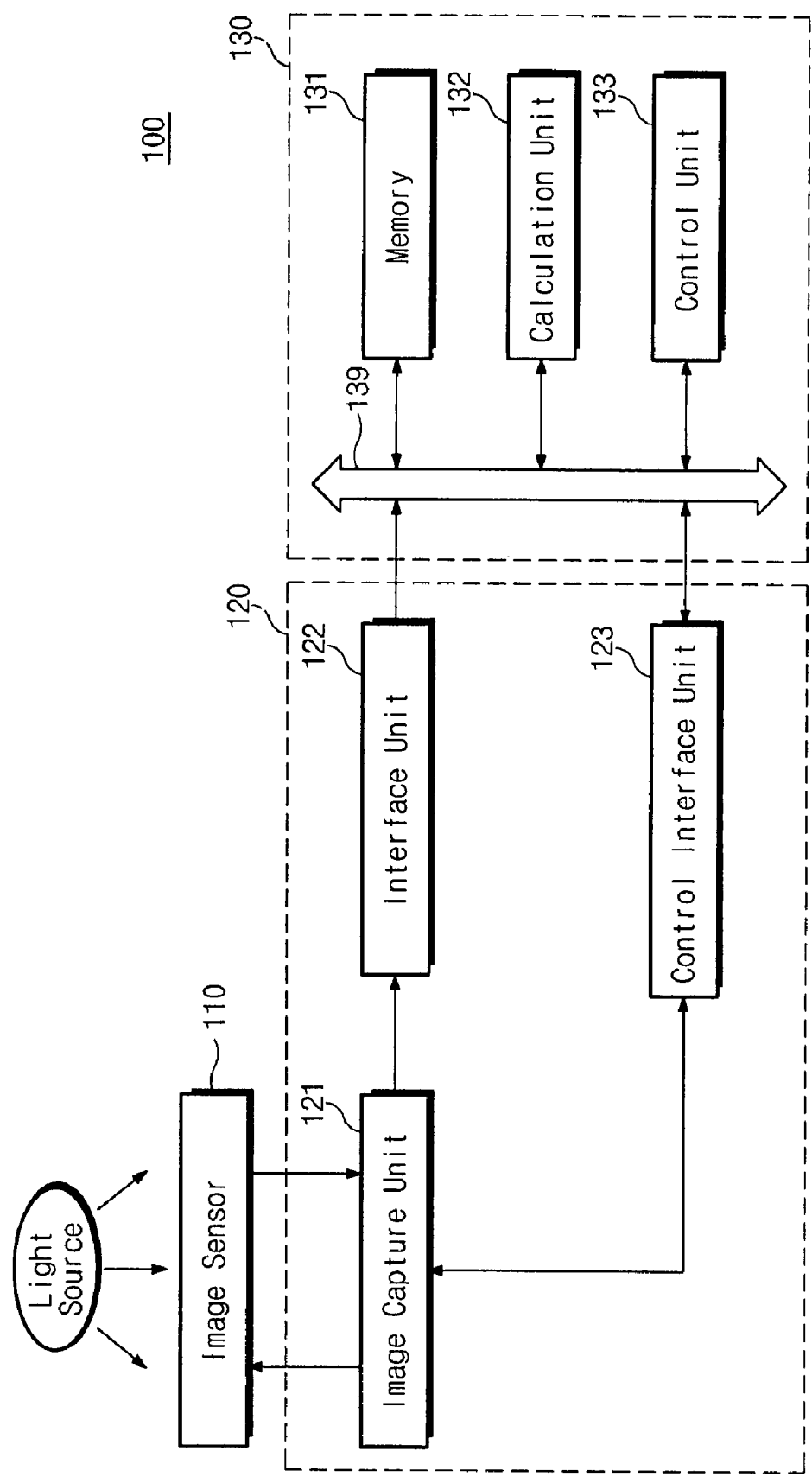
FIG. 1 is a block diagram showing an embodiment of an image sensor evaluation device in accordance with the present invention.

Preferred embodiments in accordance with aspects of the present invention will be described below in more detail with reference to the accompanying drawings. The present invention can, however, be embodied in different forms and should not be constructed as limited to the embodiments set forth herein. Like reference numerals refer to like elements throughout the accompanying figures.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Hereinafter, exemplary embodiment in accordance with aspects of the present invention will be described in conjunction with the accompanying drawings.

FIG. 1 is a block diagram showing an embodiment of an image sensor evaluation device in accordance with an aspect of the present invention.

Referring to FIG. 1, the image sensor evaluation device 100 is comprised of an image sensor 110, an image capture block 120, and a data processing block 130. The image sensor 110 provides an image signal, responding to external light incident thereon, to the image capture block 120. In various embodiments, an image signal output from the image sensor 110 is one of analog and digital signals.

The image capture block 120 converts an image signal, which is received from the image sensor 110, into binary data to be provided to the data processing block 130, controlling an operation of the image sensor 110 in response to control signals received from the data processing block 130. The data processing block 130 evaluates characteristics of the image sensor 110 on a basis of the binary data received from the image capture block 120 and provides the control signals to the image capture block 120 for controlling an operation of the image sensor 110.

The image capture block 120 includes an image capture unit 121, a data interface unit 122, and a control interface unit 123. The image capture unit 121 converts an image signal, which is input from the image sensor 121, into binary image data. The data interface unit 122 transfers the binary image data to the data processing block 130 from the image capture unit 121. The control interface unit 123 transfers the control signal to the image capture unit 121 from the data processing block 130.

The data processing block 130 includes a memory 131, a calculation unit 132, and a control unit 133 connected to a bus 139. The memory 131 stores image data received from the image capture block 120, and calculation results output from the calculation unit 132. The calculation unit 132 executes a series of calculating steps by the characteristic evaluation algorithm of the image sensor 110 with reference to the digital data and calculation results stored in the memory 131. The control unit 133 generates the control signals for controlling the image capture block 120, as well as the data processing block 130.

In an embodiment, if the memory 131 stores a software program for executing the characteristic evaluation algorithm of the image sensor 110, the control unit 133 controls the calculation unit 132 and the image capture block 120 in compliance with program commands read out from the memory 131.

Hereafter will be described an embodiment of a characteristic evaluation algorithm of the image sensor in accordance with aspects of the present invention. In particular, this specification describes an embodiment of an algorithm for evaluating an RN characteristic among characteristics of the image sensor.

Figure 2:
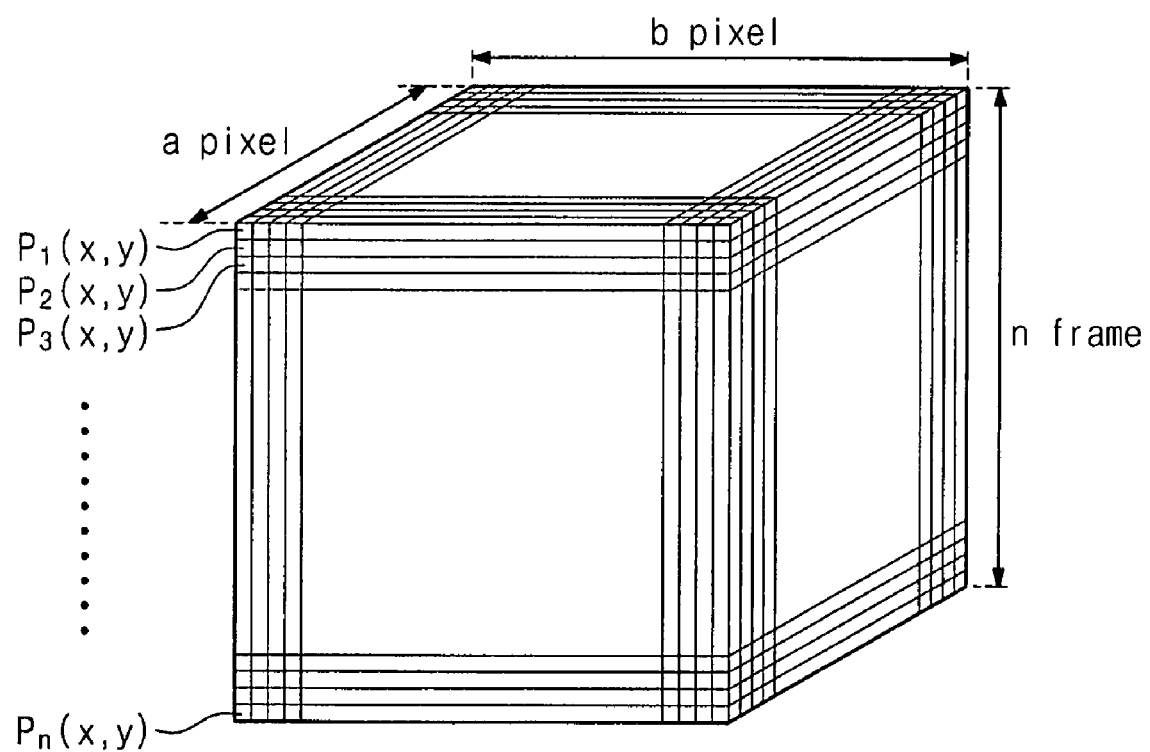
FIG. 2 is a schematic diagram illustrating a dimension of image data when a signal captured by an image sensor is converted into binary image data by an image capture block by the device if FIG. 1.

FIG. 2 is a schematic diagram illustrating a dimension of image data when a signal captured by the image sensor 110 is converted into binary image data by the image capture block.

When the number of pixels in a frame is j*k, the image capture block 120 provides the data processing block 130 with image data of totally n-frames from the first to n'th frame. Hereinafter, image data of the (x,y)'th pixel of the i'th frame is represented in $P_i=P_i(x,y)=P(x,y,i)$.

Figure 3:
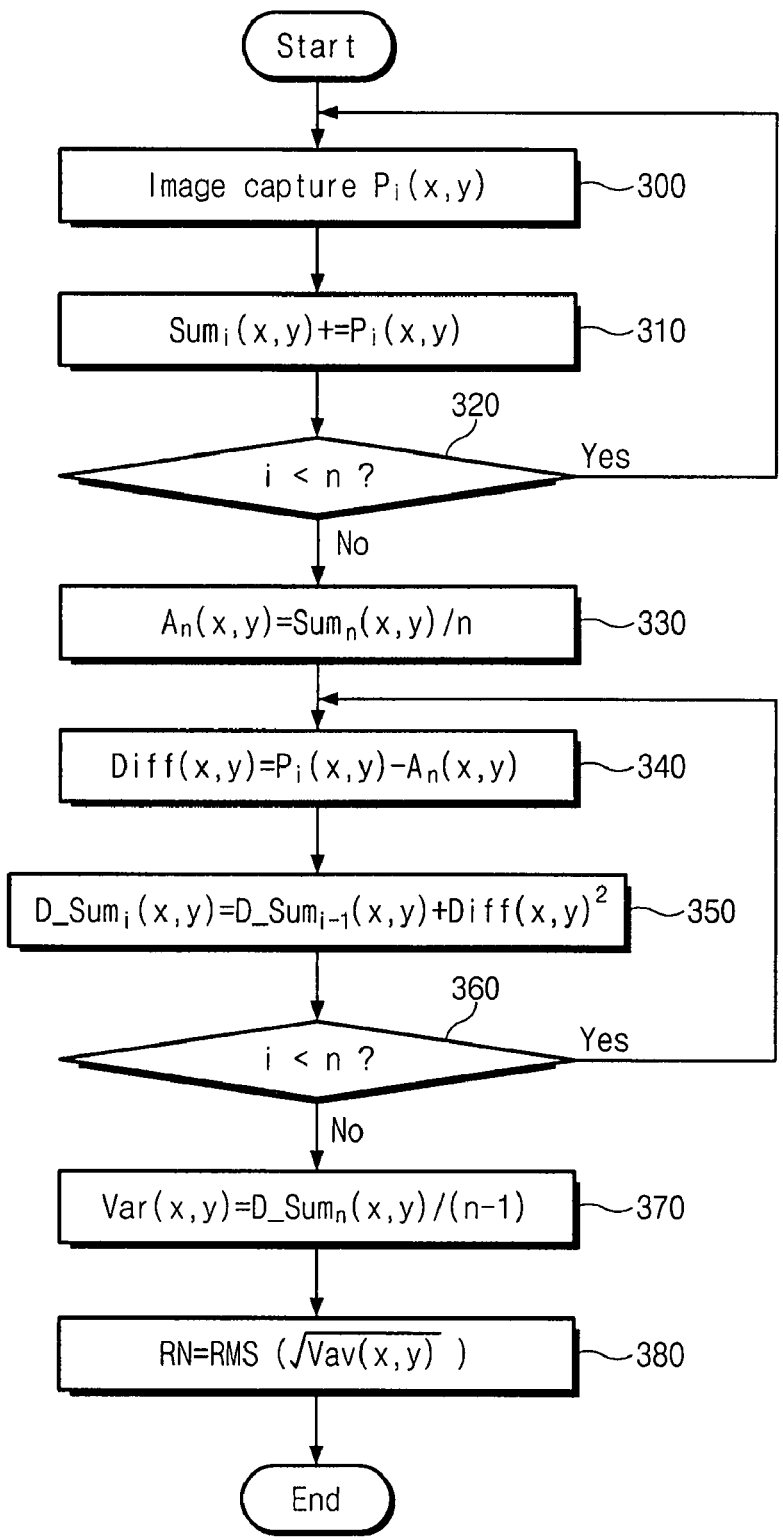
FIG. 3 is a flow chart showing a general prior art random noise (RN) evaluation algorithm for an image sensor.

FIG. 3 is a flow chart showing a general prior art random noise (RN) evaluation algorithm for an image sensor. The general RN evaluation algorithm can be carried out by the calculation unit 132 shown in FIG. 1.

In a step 300, the calculation unit 132 obtains the image data P(x,y,i) that is captured from the image sensor 110 and converted into digital data. The image data P(x,y,i), which is captured from the image sensor 110 and converted into digital data, is stored in the memory 131. In a step 310, the calculation unit 132 operates to calculate an accumulation value $Sum_i(x,y)=Sum_{i-1}(x,y)+P_i(x,y)$ of each pixel. In a step 320, the calculation unit 132 determines whether a current frame is the n'th frame. If i is less than n, then n frames of image data have not been summed and the procedure returns to the step 300. Therefore, steps 300 through 320 calculate a sum of image data each for a*b pixels across all of the n frames.

In a step 330, the calculation unit 132 calculates an image data average $A_n(x,y)=Sum_n(x,y)/n$ of image data of the n frames, each having a*b pixels. In a step 340, the calculation unit 132 operates to calculate a difference Diff(x,y) between the image data $P_i(x,y)$ and the average $A_n(x,y)$ for each pixel, which can be stored in the memory 131. Here, the difference means a value determined by subtracting the average from the corresponding image data. In a step 350, the calculation unit 132 calculates a difference square sum D_Sum(x,y) by accumulating squares of differences Diff(x,y) for each pixel. The steps 330 through 350 are repeated for each of the n-frames, as indicated by decision box 360.

In a step 370, the calculation unit 132 calculates a variance Var(x,y) for each pixel. An RN value is obtained from an RMS for an average difference that is a square root of the variance Var(x,y) for all pixels. The RN evaluation algorithm is summarized in Equation 1.

$$P_i = p_i(x, y) = p(x, y, i), \qquad \text{[Equation 1]}$$

$$Average_n(p(x, y, n)) = A_n(x, y) = \overline{A},$$

$$\overline{A} = \frac{Sum_n(p(x, y, n))}{n}$$

$$= \frac{\sum_{i=1}^{n} p(x, y, i)}{n}$$

$$= \frac{\sum_{i=1}^{n} p(x, y)}{n}$$

$$= \frac{\sum_{i=1}^{n} P_i}{n}$$

$$Variance_n(x, y) = Var_n(x, y) = Var_n,$$

$$Var_n = \frac{\sum_{i=1}^{n}(p_i - \overline{A})^2}{n}.$$

$$Stdev_n(x, y) = \sqrt{Var_n(x, y)},$$

$$RN = RMS(Stdev_n(x, y))$$

$$= \sqrt{\frac{\sum_{i=1}^{x}\sum_{j=1}^{y}(Stdev_n(x, y))^2}{x \times y}}$$

$$= \sqrt{\frac{\sum_{i=1}^{x}\sum_{j=1}^{y}Var_n(x, y)}{x \times y}}$$

In Equation 1, $A_n(x,y)$ is an average value, $Var_n(x,y)$ is variance. $Stdev_n(x,y)$ is standard deviation, and RN means random noise.

In order to conduct step 340 shown in FIG. 3, the memory 131 must store a*b*n image data for each pixel. In other words, the memory 131 is sized to be at least a*b*n*w. Here, w means a bit length of image data. As the number of pixels, a*b, included in a frame increases and the number of accumulated image data, i.e., the number of frames n, increases, the memory 131 is enlarged in geometric progression.

Figure 4:
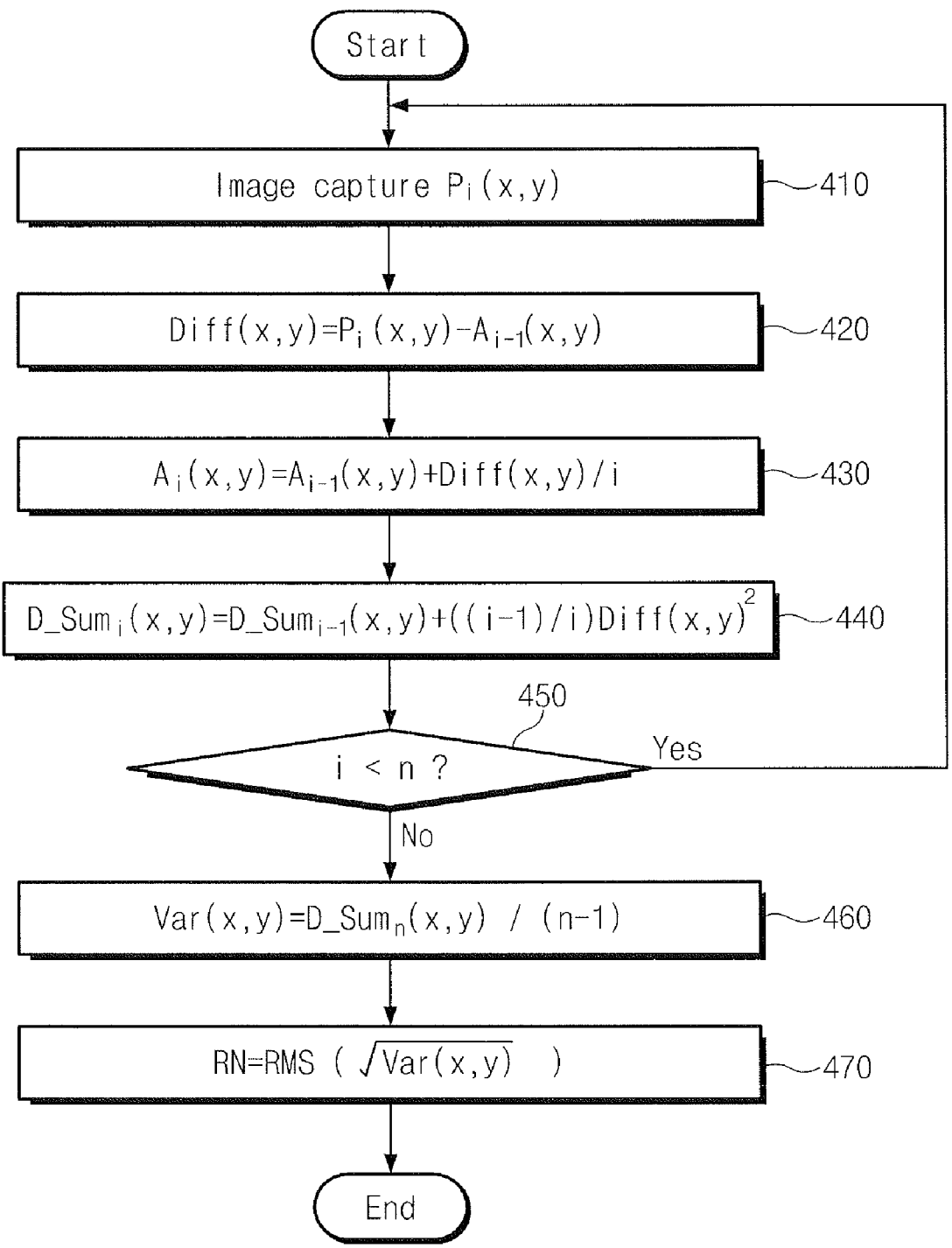
FIG. 4 is a flow chart showing an embodiment of a random noise (RN) evaluation algorithm in accordance with the present invention.

However, the RN evaluation algorithm according to the preferred embodiment, in accordance with the present invention, is able to obtain an RN value without storing image data of all pixels in number of a*b*n, e.g., see FIG. 4. That is, the RN evaluation algorithm in accordance with the present invention is able to obtain an RN value by calculating an average, variance, and difference at every frame using the image data included in a current frame and an average, variance, differences of previously input frames. The memory 131 doe not store image data of the previously input frames, but stores average, variance, and differences of the previous input frames, so that the memory 131 is rarely enlarged in size.

An average $A_n$ of image data of pixels included in the n'th frame can be summarized in Equation 2.

$$P_i = p_i(x, y) = p(x, y, i),$$ [Equation 2]

$$Average_n(p(x, y, n)) = A_n(x, y) = \overline{A},$$

$$A = \frac{Sum_n(p(x, y, n))}{n}$$

$$= \frac{\sum_{i=1}^{n} p(x, y, i)}{n}$$

$$= \frac{\sum_{i=1}^{n} p(x, y)}{n}$$

$$= \frac{\sum_{i=1}^{n} Pi}{n}$$

$$A_n = \frac{\sum_{i=1}^{n} Pi}{n}$$

$$= \frac{\left(\sum_{i=1}^{n-1} Pi - P_n\right)}{n}$$

$$= \frac{n-1}{n}\left(\frac{\sum_{i=1}^{n-1} Pi}{n-1} - \frac{P_n}{n-1}\right)$$

$$= \frac{n-1}{n}\left(A_{n-1} + \frac{P_n}{n-1}\right)$$

$$A_n = \frac{n \times A_{n-1} - A_{n-1} + P_n}{n} = A_{n-1} + \frac{(P_n - A_{n-1})}{n}$$

From Equation 2, it can be seen that the average $A_n$ of image data for pixels included in the n'th frame is obtained by means of an average $A_{n-1}$ of pixels of the (n−1)'th frame and image data $P_n$ of pixels of the n'th frame.

For optimization of the RN evaluation algorithm, the following conditions must be satisfied:

(Condition 1) there must be no overhead to the memory in the evaluation system; and (Condition 2) evaluation results of the algorithm must be identical to each other between before and after the optimization.

Transferring the first value of the difference square sum $D\_Sum(x,y)$, which is calculated by the steps 340 and 350 shown in FIG. 3, into $D\_Sum\_Old_n(x,y)$, the second value $D\_Sum\_New_n(x,y)$ corresponding to the first value $D\_Sum\_Old_n(x,y)$ can be given by Equation 3.

$$D\_Sum\_Old_n(x, y) = \sum_{i=1}^{n} (P_i - A_i)^2 = \sum_{i=1}^{n}\left(P - \frac{\sum_{j=1}^{n} p_j}{i}\right)^2$$ [Equation 3]

In the steps 340 and 350, the calculation unit 132 calculates the first value of the difference square sum $D\_Sum\_Old_n(x, y)$, which is a sum of differences between image data of all pixels and the average, by means of the average $A_n$ for all of the n-frames. But, in this embodiment, the second value of the difference square sum $D\_Sum\_New_n(x,y)$ is calculated by means of currently input image data and the average $A_i$ from the first to a current frame.

Table 1 hereinafter comparatively shows the first value of the difference square sum $D\_Sum\_Old_n(x,y)$ and the second value of the difference square sum $D\_Sum\_New_n(x,y)$ for every frame (i=0, 1, 2, . . . , n).

TABLE 1

| i | $D\_Sum\_Old_i(x, y)$ | $D\_Sum\_New_i(x, y)$ |
|---|---|---|
| 1 | $\left(P_1 - \frac{P_1}{1}\right)^2 = 0$ | $\left(P_1 - \frac{P_1}{1}\right)^2 = 0$ |

TABLE 1-continued

| i | D_Sum_Old$_i$(x, y) | D_Sum_New$_i$(x, y) |
|---|---|---|
| 2 | $\left(P_1 - \frac{P_1+P_2}{2}\right)^2 + \left(P_1 - \frac{P_1+P_2}{2}\right)^2 = \frac{1}{2}(P_2 - P_1)^2$ | $\left(P_1 - \frac{P_1}{2}\right)^2 + \left(P_1 - \frac{P_1+P_2}{2}\right)^2 = \frac{1}{4}(P_2 - P_1)^2$ |
| . | . | . |
| . | . | . |
| . | . | . |
| n | $\sum_{i=0}^{n}(P_i - \overline{A})^2$ | $\sum_{i=0}^{n}(P_i - A_i)^2$ |

From Table 1, it can be seen that the first and second values D_Sum_Old$_n$(x,y) and D_Sum_New$_n$(x,y) are real numbers that are different from each other and become larger as the number of input frames increases. If the first and second values D_Sum_Old$_n$(x,y) and D_Sum_New$_n$(x,y) are proportional to each other, there is a constant C that can be defined to represent the proportionality.

$$\sum_{i=1}^{n}(P_i - A_n)^2 = \sum_{i=1}^{n}C(P_i - A_i)^2 \quad \text{[Equation 4]}$$

If there is the constant C satisfying Equation 4, the constant C is summarized into Equation 5.

$$C = \frac{\sum_{i=1}^{n}(P_i - A_n)^2}{\sum_{i=1}^{n}(P_i - A_i)^2} \quad \text{[Equation 5]}$$

In order to find there is the constant C adaptable to Equation 5, assuming that image data of all pixels are the same in $P_1=1$, $P_2=2$, $P_3=3$, and $P_4=4$, Table 2 shows results from substituting the four image data $P_1$~$P_4$ in Table 1.

TABLE 2

| i | D_Sum_Old$_i$(x,y) | D_Sum_New$_i$(x,y) | C |
|---|---|---|---|
| 1 | 0 | 0 | — |
| 2 | 0.5 | 0.25 | 2 |
| 3 | 2 | 1.25 | 1.6 |
| 4 | 5 | 3.5 | ≈1.43 |

From Table 2, it can be seen that there is no constant satisfying Equation 5 because the constant C is variable across the number of frames and the first and second values of the difference square sum D_Sum_Old$_n$(x,y) and D_Sum_New$_n$(x,y) are not proportional to each other. Assuming that the constant C is variable across the number of frames, Equation 4 can be changed into Equation 6.

$$\sum_{i=1}^{n}(P_i - A_n)^2 = \sum_{i=1}^{n}C_i(P_i - A_i)^2 \quad \text{[Equation 6]}$$

As such, with assuming that there is the constant Ci variable along the number of frames, Equation 6 is verified by mathematical induction as follows.

In verifying Equation 6, Equation 6 is rewritten with n=1. As bilateral terms of Equation are 0, Equation 6 is verified. Next, in order to verify Equation 6 when n=k, it turns to Equation 7 if the left term is summarized after applying n=k thereto.

$$\sum_{i=1}^{k}(P_i - A_k)^2 = \sum_{i=1}^{k}P_j\left(p_i - \frac{\sum_{j=1}^{k}P_j}{k}\right)^2 \quad \text{[Equation 7]}$$

$$= \left(\frac{(k-1)P_1}{k} - \frac{P_2}{2} - \ldots - \frac{P_k}{k}\right)^2 +$$

$$\left(-\frac{P_1}{k} + \frac{(k-1)P_2}{k} - \ldots - \frac{P_k}{k}\right)^2 + \ldots +$$

$$\left(-\frac{P_1}{k} - \frac{P_2}{k} - \ldots - \frac{(k-1)P_k}{k}\right)^2$$

Equation 7 is converted into Equation 8 by solving the square terms.

$$\sum_{i=1}^{k}(P_i - A_k)^2 = \sum_{i=1}^{k}\left(p_i - \frac{\sum_{j=1}^{k}P_j}{k}\right)^2 \quad \text{[Equation 8]}$$

$$= \left(\frac{(k-1)^2}{k^2} + \ldots - \frac{k-1}{k^2}\right)\sum_{i=1}^{k}P_i^2 +$$

$$\left(-\frac{4(k-1)}{k^2} + \frac{2(k-2)}{k}\right)$$

$$(P_1P_2 + P_1P_3 + \ldots + P_1P_k + \ldots + P_2P_3 +$$

$$P_2P_4 + \ldots + P_2P_k + \ldots + P_{k-1}P_k)$$

Now, Equation 9 is obtained from summarizing the terms of the integer k in Equation 6.

$$\sum_{i=1}^{k}(P_i - A_k)^2 = \sum_{i=1}^{k}\left(p_i - \frac{\sum_{j=1}^{k}P_j}{k}\right)^2 \quad \text{[Equation 9]}$$

$$= \frac{k-1}{k}\sum_{i=1}^{k}P_i^2 -$$

$$\frac{2}{k}(P_1P_2 + P_1P_3 + \ldots + P_1P_k + \ldots +)$$

$$P_2P_3 + P_2P_4 + \ldots +$$

$$P_2P_k + \ldots + P_{k-1}P_k$$

Next, it results in Equation 10 by summarizing the right term of Equation 6.

$$\sum_{i=1}^{k}C_i(P_i - A_k)^2 = \sum_{i=1}^{k}C_i\left(p_i - \frac{\sum_{j=1}^{k}P_j}{k}\right)^2 \quad \text{[Equation 10]}$$

$$= C_1\left(P_1 - \frac{P_1}{1}\right)^2 + C_2\left(P_2 - \frac{P_1 + P_2}{2}\right)^2 +$$

$$C_3\left(P_3 - \frac{P_1 + P_2 + P_3}{3}\right)^2 + \ldots +$$

$$C_{k-1}\left(P_{k-1} - \frac{P_1 + P_2 + \ldots + P_{k-1}}{k-1}\right)^2 +$$

$$C_k\left(P_k - \frac{P_1 + P_2 + \ldots + P_k}{k}\right)^2$$

Equation 10 is summarized into Equation 11.

$$\sum_{i=1}^{k}C_i(P_i - A_i)^2 = \quad \text{[Equation 11]}$$

$$\sum_{i=1}^{k-1}C_i(p_i - A_i)^2 + C_k\left(P_k - \frac{P_1 + P_2 + \ldots + P_k}{k}\right)^2$$

As the sum of difference squares to the number k−1 in the right term of Equation 11 is identical to the term with n=k−1 of Equation 6 (it is assumed that Equation 12 is verified when n=k−1), Equation 12 is given by:

$$\sum_{i=1}^{k-1}C_i(P_i - A_i)^2 = \sum_{i=1}^{k-1}(p_i - A_{k-1})^2 \quad \text{[Equation 12]}$$

The right term of Equation 12 is equal to Equation 8 when substituting the parameter k−1 for k, which is summarized in Equation 13.

$$\sum_{i=1}^{k-1}(P_i - A_{k-1})^2 = \frac{k-2}{k-1}\sum_{i=1}^{k-1}P_i^2 - \frac{2}{k-1} \quad \text{[Equation 13]}$$

$$\begin{pmatrix} P_1P_2 + P_1P_3 + \ldots + \\ P_1P_{k-1} + \ldots + P_2P_3 + \\ P_2P_4 + \ldots + P_2P_{k-1} + \ldots + P_{k-2}P_{k-1} \end{pmatrix}$$

Equation 14 is obtained from rearranging the k'th difference squares of the right term of Equation 13.

$$C_k\left(P_k - \frac{\begin{matrix}P_1 + \\ P_2 + \ldots + \\ P_k\end{matrix}}{k}\right)^2 = C_k\left(-\frac{P_1}{k} - \frac{P_2}{k} - \ldots + \frac{(k-1)P_k}{k}\right)^2 \quad \text{[Equation 14]}$$

$$= \begin{pmatrix} \frac{C_k}{k^2}P_1^2 + \frac{C_k}{k^2}P_2^2 + \ldots + \\ \frac{C_k}{k^2}P_{k-1}^2 + \frac{(k-1)^2C_k}{k^2}P_k^2 \end{pmatrix} +$$

$$\begin{pmatrix} \frac{2C_k}{k^2}P_1P_2 + \frac{2C_k}{k^2}P_1P_3 + \ldots + \\ \frac{2C_k}{k^2}P_1P_{k-1} + \\ \frac{-2(k-1)C_k}{k^2}P_1P_k \end{pmatrix} +$$

$$\begin{pmatrix} \frac{2C_k}{k^2}P_2P_3 + \frac{2C_k}{k^2}P_2P_4 + \ldots + \\ \frac{2C_k}{k^2}P_2P_{k-1} + \\ \frac{-2(k-1)C_k}{k^2}P_2P_k \end{pmatrix} +$$

$$\begin{pmatrix} \ldots + \frac{2C_k}{k^2}P_{k-2}P_{k-1} + \\ \frac{-2(k-1)C_k}{k^2}P_{k-1}P_k \end{pmatrix}$$

Comparing to Equation 9 in each term after summarizing Equation 11 by substituting Equations 13 and 14 therein, four types of equations are obtained as shown in Equation 15 for $C_k$.

$$\frac{C_k}{k^2} + \frac{k-2}{k-1} = \frac{k-1}{k}, C_k = \frac{k}{k-1} \quad \text{[Equation 15]}$$

$$\frac{(k-1)^2C_k}{k^2} = \frac{k-1}{k}, C_k = \frac{k}{k-1}$$

$$\frac{2C_k}{k^2} - \frac{2}{k-1} = -\frac{2}{k}, C_k = \frac{k}{k-1}$$

$$\frac{-2(k-1)C_k}{k^2} = -\frac{2}{k}, C_k = \frac{k}{k-1}$$

Summarizing by substituting the constant $C_i$, which is variable along the number of frames, into Equation 6, results in Equation 16.

$$\sum_{i=1}^{k}(P_i - A_k)^2 = \sum_{i=1}^{k}\left(\frac{i}{i+1}\right)(P_i - A_i)^2 \quad \text{[Equation 16]}$$

Next, it can be seen that the relationship in Equation 16 is permissible in the case of n=k+1.

Therefore, the constant $C_i$ can be variable across the number of frames i and Equations 15 and 16 allow all integers larger than 1 therein. In addition, Equation 17 is obtained from applying the constant $C_i$ to Equation 11.

$$\sum_{i=1}^{k} C_i(P_i - A_i)^2 = \qquad \text{[Equation 17]}$$

$$\sum_{i=1}^{n-1} C_i(P_i - A_i)^2 + \left(\frac{n}{n+1}\right)\left(P_n - \frac{P_1 + P_2 + \ldots + P_n}{n}\right)^2$$

Equation 17 simplifies to Equation 18:

$$\text{D\_Sum}_n(x, y) = \text{D\_Sum}_{n-1}(x, y) + \left(\frac{n}{n-1}\right)(P_n - A_n(x, y))^2 \qquad \text{[Equation 18]}$$

The average $A_n(x,y)$ of Equation 18 is optimized in Equation 19 by using Equation 2 with updating from the average $A_{n-1}(x,y)$ of the previous frame.

$$\text{D\_Sum}_n(x, y) = \qquad \text{[Equation 19]}$$
$$\text{D\_Sum}_{n-1}(x, y) + \left(\frac{n-1}{n}\right)(P_n - A_{n-1}(x - y))^2$$

Referring to Equation 19, the average $A_n(x,y)$ and the difference square sum $\text{D\_Sum}_n(x,y)$ are also undated at the same tine when the image data $P_n(x,y)$ of a pixel is updated.

FIG. 4 is a flow chart showing an embodiment of the RN evaluation algorithm in accordance with the present invention. FIG. 4 will be described with reference to the diagram of FIG. 1.

First, in a step 410, the calculation unit 132 receives image data $P_i(x,y)$ that is captured by the image sensor 110 and converted into digital data by the image capture block 120.

Next, in a step 420, the calculation unit 132 operates to calculate the difference Diff(x,y) between the current input image data $P_i(x,y)$ and the average $A_{i-1}(x,y)$ up to the previous frame of each pixel. The average $A_{i-1}(x,y)$ up to the previous frame of each pixel is a value stored in the memory 131.

Then, in a step 430, the calculation unit 132 obtains the average $A_i(x,y)$ at a current frame of each pixel with reference to the average $A_{i-1}(x,y)$ up to the previous frame for each pixel and the difference Diff(x,y) is calculated in the step 420. The obtained average $A_i(x,y)$ is stored in the memory 131.

Thereafter, in a step 440, the calculation unit 132, as summarized in Equation 19, calculates the difference square sum $\text{D\_Sum}_i(x,y)$ with reference to the difference Diff(x,y) and the previous difference square sum $\text{D\_Sum}_{i-1}(x,y)$ read from the memory 131. The difference square sum $\text{D\_Sum}_i(x,y)$ is stored in the memory 131.

Continuously, in a step 450, the calculation unit 132 determines whether a current frame i is the last frame n. The steps 410 through 450 are repeated until the current frame i reaches the last frame n.

Next, in a step 460, the calculation unit 132 operates to calculate the variance Var(x,y).

Finally, the calculation unit 132 obtains an RN value from calculating an (root mean square) RMS of a root square of the variance Var(x,y).

As can be seen from the flow chart shown in FIG. 4, the memory 131 stores only the difference square sum $\text{D\_Sum}_i(x,y)$ and the average $A_i(x,y)$ at each frame, and does not store image data of the a*b*n pixels. If necessary, image data $P_i(x,y)$ of pixels of a currently input frame can be stored in the memory 131. According to the RN evaluation algorithm embodied herein, although the number of pixels for a frame, a*b, increases and the number of frames, n, increases, the memory 131 is less variable, in size, than the memory required for the former RN evaluation algorithm shown in FIG. 3.

Conventionally, in an evaluation system with a fixed memory size, evaluating RN for a high-resolution image sensor is usually carried out for a part of the image sensor or with a restriction on the number of frames. The RN evaluation algorithm in accordance with the present invention makes it possible to conduct RN evaluation for a high-resolution image sensor by means of the minimum size of memory.

Meantime, in the general RN evaluation algorithm shown in FIG. 3, the calculation unit is needed to execute the steps 340 through 360 as many as the number of all frames, after completing the steps 300 and 310, every frame. Namely, there are two repetitive loops. Otherwise, in the proposed RN evaluation algorithm in accordance with the present invention, as shown in FIG. 4, one-time execution of the steps 410 through 450 every frame is enough to obtain an RN value, which shortens the whole operation time for the RN evaluation algorithm.

Figure 5:
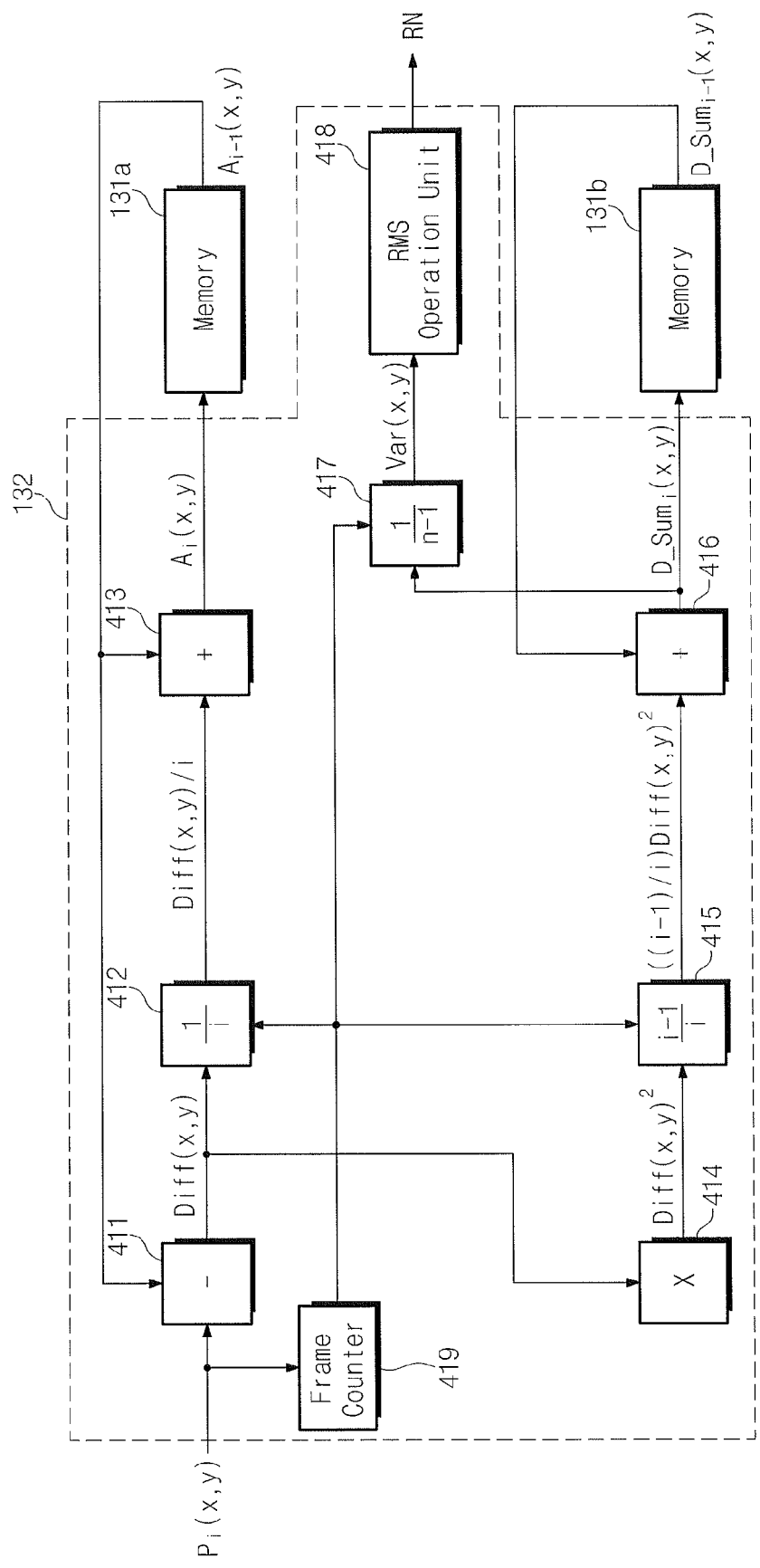
FIG. 5 is a block diagram illustrating an embodiment of a structure of the calculation unit of FIG. 1, which can execute the method of FIG. 4, in accordance with aspects of the present invention.

FIG. 5 is a block diagram illustrating an embodiment of a structure of the calculation unit 132 of FIG. 1 in accordance with the present invention. The calculation unit 132 is configured to be suitable for executing the algorithm shown in FIG. 4.

Referring to FIG. 5, the calculation unit 132 is comprised of a frame counter 419, subtracters 411 and 416, dividers 412, 415, and 417, an adder 413, a multiplier 414, and an RMS operation unit 418. Memories 131a and 131b shown in FIG. 4 mean partial regions of the memory 131 shown in FIG. 1.

The frame counter 419 outputs a counting value i incrementing by 1 whenever the image data $P_i(x,y)$ of a frame is input thereto from the data interface unit 122. The counting value i output from the frame counter 410 means the number of frames of image data input to the calculation unit 132. The number of frames, i, is provided to the dividers 412, 415, and 417.

The subtracter 411 calculates a difference between the currently input image data $P_i(x,y)$ and the average $A_{i-1}(x,y)$ up to the previous frame for each pixel, and outputs the difference Diff(x,y). The average $A_{i-1}(x,y)$ up to the previous frame of each pixel is a value stored in the memory 131a.

The divider 412 operates to divide the difference Diff(x,y) by the frame number i and the adder 413 outputs the current frame average $A_i(x,y)$ from adding the previous frame average $A_{i-1}(x,y)$ to an output of the divider 412. The current frame average $A_i(x,y)$ is stored in the memory 131a.

The multiplier 414 calculates a square of the difference Diff(x,y). The divider 415 multiplies the square of the difference Diff(x,y)$^2$ by (i−1)/i. In another embodiment, the divider 415 can be implemented with a multiplier.

The subtracter 416 outputs the current frame difference square sum $\text{D\_Sum}_i(x,y)$ by calculating a difference between an output of the divider 415 and the previous frame difference square sum $\text{D\_Sum}_{i-1}(x,y)$ stored in the memory 131b. The current frame difference square sum $\text{D\_Sum}_i(x,y)$ output from the subtracter 416 is stored in the memory 131b.

The divider 417 outputs the variance Var(x,y) by dividing the current frame difference square sum D_Sum$_i$(x,y), which is output from the subtracter 416, by n−1 when the frame number i is identical to n.

The RMA operation unit 418 outputs an RN value by obtaining an RMS of a square root of the Var(x,y) output from the divider 418.

According to the present invention as aforementioned, RN is evaluated for a high-resolution image sensor with the minimum memory size. Moreover, it shortens a time for executing the RN evaluation algorithm.

The above-disclosed subject matter is to be considered illustrative, and not restrictive, and the appended claims are intended to cover all modifications, enhancements, and other embodiments that fall within the true spirit and scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A random noise evaluation method, performed by a random noise evaluation device of an image sensor, comprises:
    capturing and obtaining current image data;
    calculating a difference between the current image data and an average of previous image data;
    calculating a current difference square sum using the difference and a previous difference square sum; and
    calculating a random noise value using the current difference square sum,
    wherein calculating the difference and the current difference square sum is repeated while inputting a predetermined number of frames, and
    wherein at an i'th frame, i is a positive integer, the current difference square sum is obtained using an equation:

[the previous difference square sum]+(((i−1)/i)*[the difference]).

2. The random noise evaluation method as set forth in claim 1, which further comprises: calculating a current image data average using the difference and a previous image data average.

3. The random noise evaluation method as set forth in claim 1, which further comprises: at an i'th frame, where i is a positive integer, summing the current image data average with the previous image data average and dividing by i.

4. The random noise evaluation method as set forth in claim 1, which further comprises: when the number of frames is n, where n is a positive integer, calculating the random noise value by calculating a variance obtained from an equation:

[the current difference square sum]/(n−1).

5. The random noise evaluation method as set forth in claim 4, wherein the random noise value is a root-mean-square value of a square of the variance.

6. A random noise evaluation device of an image sensor, comprising:
    a memory;
    an image sensor including at least one pixel and configured to output an image signal in correspondence with light sensed by the at least one pixel;
    an image capture unit configured to output image data that is converted into a form of binary signal from the image signal of the image sensor; and
    a calculation unit configured to generate a random noise value of the image sensor using a series of the image data provided from the image capture unit, the calculation unit configured to calculate: (1) a difference between current image data and an average of previous image data stored in the memory, (2) a current difference square sum using the difference and a previous difference square sum stored in the memory, and (3) the random noise value using the current difference square sum,
    wherein the calculation unit is configured to calculate a current image data average using the difference and the previous image data average,
    wherein when an i'th image data is input, where i is a positive integer, the current difference square sum is obtained using an equation:

[the previous difference square sum]+(((i−1)/i)*[the difference]).

7. The random noise evaluation device as set forth in claim 6, wherein the calculation unit is configured to store the current difference square sum in the memory.

8. The random noise evaluation device as set forth in claim 6, wherein the calculation unit is configured to store the current image data average in the memory.

9. The random noise evaluation device as set forth in claim 6, wherein the calculation unit is configured to calculate a variance using an equation: [the current difference square sum]/([the total image data number]−1), after calculating the current difference square sum for the series of the image data.

10. The random noise evaluation device as set forth in claim 9, wherein the random noise value is a root-mean-square value of a square of the variance.

11. The random noise evaluation device as set forth in claim 6, wherein when an i'th image data is input, where i is a positive integer, the calculation unit is configured to calculate the current image data average as a sum of the previous image data average and [the difference]/i.

12. A random noise evaluation device of an image sensor, comprising:
    a memory;
    an image sensor including at least one pixel and configured to output an image signal in correspondence with light sensed by the at least one pixel;
    an image capture unit configured to output image data that is converted into a form of binary signal from the image signal of the image sensor; and
    a calculation unit configured to generate a random noise value of the image sensor using a series of the image data provided from the image capture unit, the calculation unit comprising:
        a counter configured to count a frame number of the series of the image data input from the image capture unit;
        a first operation unit configured to output a difference between image data of a current frame and an average of image data of a previous frame stored in the memory;
        a second operation unit configured to divide an output of the first operation unit by the frame number;
        a third operation unit configured to calculate an average of image data of the current frame by adding an output of the second operation unit to the average of image data of the previous frame;
        a fourth operation unit configured to calculate a square of the output of the first operation unit;
        a fifth operation unit configured to multiply an output of the fourth operation unit by ([the frame number]−1)/[the frame number];

a sixth operation unit configured to calculate a difference square sum that is a difference between an output of the fifth operation unit and a previous difference square sum of the previous frame stored in the memory;

a seventh operation unit configured to divide the difference square sum of the sixth operation unit by [the frame number]−1; and an eighth operation unit configured to calculate a random noise value that is a root-mean-square value of an output of the seventh operation unit.

13. The random noise evaluation device as set forth in claim 12, wherein the calculation unit is also configured to store in the memory the average of image data of the current frame, which is output from the third operation unit, and the difference square sum output from the sixth operation unit.

14. The random noise evaluation device as set forth in claim 12, wherein the first and sixth operation units are subtracters.

15. The random noise evaluation device as set forth in claim 12, wherein the second, fifth, and seventh operation units are dividers.

16. The random noise evaluation device as set forth in claim 12, wherein the third operation unit is an adder.

17. The random noise evaluation device as set forth in claim 12, wherein the fourth operation unit is a multiplier.

* * * * *